106-84 AU 118 EX
10/21/86 XR 4,618,079

United States Patent [19]

Barnes et al.

[11] Patent Number: 4,618,079

[45] Date of Patent: Oct. 21, 1986

[54] REFRACTORY, HEAT-INSULATING SLABS

[75] Inventors: Andrew Barnes, Birmingham; Gary K. Elliott, Stourbridge; William MacFarlane, Birmingham, all of England; Stephen T. Pheasant, Makati, Philippines

[73] Assignee: Foseco Trading A.G., Chur, Switzerland

[21] Appl. No.: 549,811

[22] Filed: Nov. 8, 1983

[30] Foreign Application Priority Data

Dec. 1, 1982 [GB] United Kingdom ................ 8234319

[51] Int. Cl.⁴ ........................................ C04B 35/04

[52] U.S. Cl. ........................................ 222/591; 106/84; 501/95; 501/119; 501/133

[58] Field of Search ...................... 222/591, 606, 607; 164/518, 519; 106/38.22, 38.27, 38.28, 84; 249/197-202; 252/62; 266/275, 276, 280-284, 236; 264/30; 501/119, 95, 133

[56] References Cited

U.S. PATENT DOCUMENTS 3,208,861 9/1965 Henry et al. ........................ 106/84
3,233,015 2/1966 Davies ........................ 266/284
3,257,217 6/1966 Van Dreser ........................ 106/84

FOREIGN PATENT DOCUMENTS 0064863 11/1982 European Pat. Off. ........... 222/591
528232 4/1979 Japan .
1364665 8/1974 United Kingdom .
1380442 1/1975 United Kingdom ................ 501/95
1575124 9/1980 United Kingdom .
2080505 7/1981 United Kingdom .

*Primary Examiner*—Joseph J. Rolla
*Assistant Examiner*—Louise S. Heim
*Attorney, Agent, or Firm*—Nixon & Vanderhye

[57] ABSTRACT

A refractory, heat-insulating slab for use in an inner, expendable lining of a tundish has a facing comprising magnesium oxide, inorganic binder but substantially no organic matter and a different backing. The facing has a combined water content not exceeding 2% by weight and the backing has a permeability of at least 10 AFS units. The facing and backing are joined together during formation of the facing or the backing. In the continuous casting of steel, the slabs have the advantage that there is little or no tendency for a significant amount of hydrogen to be picked up by the steel.

20 Claims, No Drawings

REFRACTORY, HEAT-INSULATING SLABS

This invention relates to refractory, heat-insulating slabs for use in lining tundishes, methods of making the slabs and tundishes lined with the slabs.

In the continuous casting of metals, e.g. steel, molten metal is poured from a ladle into a continuous casting mould via an intermediate vessel which acts as a constant head reservoir and is called a tundish. The tundish has a metal floor and sidewalls and one or more outlet nozzles set in the floor or a sidewall. To protect the metal floor and walls of the tundish from the effects of molten metal it is usual to line the interior of the tundish with a relatively permanent lining, often made of bricks. The tundish may additionally be provided with an inner, expendable lining of refractory, heat-insulating slabs. This is described in British patent specification No. 1364665 and is highly advantageous.

According to the present invention a refractory, heat-insulating slab for use in the inner, expendable lining of a tundish comprises a slurry-formed facing (to face molten metal in the tundish), which comprises magnesium oxide, inorganic binder but substantially no organic matter and has a combined water content not exceeding 2% by weight, and a different backing, which comprises refractory filler, and binder and has a permeability of at least 10 AFS (American Foundryman's Society) units, the facing and backing having been joined together during formation of the facing or backing.

The magnesium oxide in the facing of a slab of the invention is highly refractory, e.g. high temperature calcined magnesite such as dead burnt magnesite.

Slabs of the invention have a very important advantage in that there is little or no tendency for a significant amount of hydrogen to be picked up by molten steel from slabs of the invention present in an inner, expendable lining of a tundish through which the molten steel passes. It is well known to treat molten steel to reduce its hydrogen content to an acceptable level before supplying the steel to a tundish. However, in accordance with the present invention it has been appreciated that steel may pick up a significant amount of hydrogen from an inner, expendable lining of a tundish; by the use of slabs of the invention, this tendency can be reduced.

By having substantially no organic matter in the facing the risk of steel picking up hydrogen from such matter is minimised. In this context the term 'organic matter' is used to signify hydrogen-containing organic matter and the presence in the facing of a proportion of carbon of organic origin, e.g. coke, is not excluded.

The minimisation of organic matter in the facing virtually eliminates one source of hydrogen that might be picked up by steel. However, the facing is slurry-formed and, as the slurry-forming method involves de-watering an aqueous slurry of ingredients including a binder in a permeable mould and then heating the damp article obtained to dry it and to set the binder, this could lead to the presence in the facing of some water, a source of hydrogen that might be picked up by steel. The slurry-forming method has, however, many advantages and the heating, which preferably involves use of a temperature of about 180° C., usually serves in practice to reduce the free water content of the article to a very low level. The facing of a slab of the invention preferably contains substantially no free water.

In the facing of a slab of the invention the combined water content does not exceed 2% by weight, preferably it is not greater than 1% and more preferably it is no greater than 0.50%. It has been appreciated in accordance with the invention that, depending on the ingredients, slurry-formed slabs may contain a significant proportion of combined water because of the formation of hydrated matter during the processing of the ingredients. It has also been appreciated that the hydrated matter may be stable at temperatures well in excess of those normally used e.g. 180° C. for drying slurry-formed slabs and setting the binder and thus the hydrated matter is liable to lead to hydrogen being picked up by molten steel in contact with the slab.

It is well known that magnesium oxide becomes hydrated on contact with water to form magnesium hydroxide and the latter is not dehydrated by heating until a temperature as high as about 415° C. is reached. However, it has been found in accordance with the invention that by careful choice of the magnesium oxide a high proportion of magnesium oxide can be included in the slurry-formed facing and the combined water content of the facing still kept low without any need to use high temperatures to decompose hydrated matter and drive off the water. The magnesium oxide used in making the facing preferably has a hydration value of 1.7 or less, more preferably 1.0 or less, most preferably 0.2 or less.

'Hydration value' as referred to in this specification is determined by allowing a sample of the material to be tested to stand in cold water for 24 hours, drying the residue at a temperature of 180° C. for four hours, weighing the dried residue and heating the dried residue at 1000° C. to constant weight. The hydration value is the weight loss caused by the heating at 1000° C. expressed as a percentage of the weight after the drying at 180° C.

There is a wide variety of standard methods for determining the hydration value of magnesium oxide. As an example, the British Standard method of BS 1902, Part 1B, involves contacting a sample with steam at 100° C. for 5 hours. The method in question in the present specification was used in view of its relation to the conditions used in making and drying slurry-formed articles and the fact that the facing is subject to high temperatures in use.

The facing of a slab of the invention preferably comprises 75 to 95% by weight of refractory filler and the magnesium oxide preferably accounts for all or most of this. Any refractory filler in addition to the magnesium oxide is preferably one or more of chromite, alumina, zirconium silicate, olivine, silica, zirconia and high alumina aluminosilicates. Part of the filler e.g. 10% by weight may be carbonaceous matter such as crushed graphite electrode scrap, thereby enhancing erosion resistance but slightly increasing thermal conductivity.

The facing preferably comprises refractory fibre, preferably in an amount of 1 to 10% by weight. The refractory fibre preferably comprises aluminosilicate fibre or calcium silicate fibre e.g. slagwool. Inclusion of 1% by weight or more of refractory fibre helps to impart advantageous strength and thermal insulating properties to the facing and avoidance of more than 10% by weight of refractory fibre helps achievement of good erosion resistance.

The amount of inorganic binder in the facing is preferably 2 to 10% by weight. If the amount of inorganic binder exceeds 10% the facing may be unduly brittle. The inorganic binder preferably comprises an alkali metal silicate, e.g. sodium silicate and in this case the $SiO_2$:$Na_2O$ weight ratio is preferably in the range of 2.5–3.7:1 and typically has a weight ratio of 3.35:1, such material being readily available commercially. Although preferred in the present invention, a disadvantage of an alkali metal silicate binder in a single layer tundish lining slab is its tendency to migrate to the surface during drying. If the amount of alkali metal silicate binder exceeds 10% by weight there is a risk that the concentration of binder, due to migration, at the permanent refractory interface, will be sufficiently high to promote alkali attack of the permanent refractory with corresponding premature failure thereof.

However, the present invention avoids this problem by employing comparatively low levels of alkali metal silicate binder in the facing and providing a different backing which effectively prevents alkali attack of the permanent refractory located behind the different backing layer of slabs of the present invention. Accordingly, any binder migration of the facing will only reach the front face of the backing but will not reach the permanent refractory.

The facing preferably comprises 3 to 7% by weight of an alkali metal silicate as described above. If the amount is less than 3% the strength of the facing may be less than is desirable whilst if the amount is greater than 7% the refractoriness of the facing may be unduly reduced and there may be a tendency to pick-up significant amounts of atmospheric moisture.

However, the backing layer of the present invention may be formulated in order to provide adequate supporting means for the facing layer when the binder present in the facing is less than 3%. In this way no incidence of brittleness nor reduced refractoriness will occur. Furthermore, the backing layer so formulated provides the facing layer with a measure of protection from mechanical shock during installation and transit.

In addition to the alkali metal silicate, the binder in the facing may contain a bonding clay, preferably in an amount not exceeding 5% by weight. The bonding clay is of value for maintaining the strength of the facing when the facing is at a high temperature, especially where the facing is exposed above the level of molten metal and slag in the tundish.

The facing is substantially free from hydrogen-containing organic matter and preferably no such matter is present. However, up to a total of 0.25% by weight of such matter e.g. in the form of organic binder and/or fibre may be tolerated, depending on the permeability of the facing. The risk of hydrogen pick-up may occur if the facing is insufficiently porous to permit the escape via the backing of any hydrogen gases formed.

The density of the facing is preferably from 1.4 to 2.0 g/cm$^3$. At lower densities the erosion resistance may be less than is desired and thus a thicker facing may be needed. At higher densities, the facing may have an undesirably high initial chilling effect on molten metal.

The fact that a slab of the invention has a backing, different from the facing, in addition to the facing enables particularly advantageous combinations of properties to be achieved; e.g. the backing is more permeable than the facing which facilitates the escape of hydrogen bearing gases; the backing may be of lower density than the facing which contributes to a more lightweight slab which is easier to handle during manufacture, transportation, installation etc.; the backing may be hydrophobic in nature thereby reducing the tendency for the slab to absorb moisture from the atmosphere; the backing may be rendered more resilient than the facing thus offering improved impact resistance in use as a tundish lining; the backing may be stronger than the facing and thus acts as a supporting means for an inherently weaker facing.

The backing comprises refractory filler and a binder and may consist of these e.g. 90% by weight filler and 5% by weight binder and 5% by weight organic and/or inorganic fibre. The filler may be any of those mentioned for the facing but it is usually not preferred to include carbonaceous filler in the backing as this increases the thermal conductivity. Other fillers that may be used include silica, e.g. silica flour, and refractory silicates including aluminosilicates. The refractory silicates may be simple silicates, e.g. olivine, or complex silicates such as aluminosilicates and these may be minerals or reclaimed materials e.g. fire clay grog. Lightweight refractory fillers e.g. expanded perlite and calcined rice husks may be used in the backing.

The binder in the backing is preferably organic. Examples of suitable organic binders are starch and resins e.g. phenol-formaldehyde and urea-formaldehyde resins. It has been found that organic binders provide the backing with more resilience than otherwise would be the case. This is particularly true in the case of phenol-formaldehyde resin binders.

The backing may include fibre and this may be refractory and/or organic. Suitable refractory fibres are exemplified by aluminosilicate fibres and calcium silicate fibres, e.g. slagwool. Paper is suitable as an organic fibre.

The backing preferably comprises a layer comprising 60 to 95% by weight of refractory filler, 0 to 20% by weight of refractory fibre, 0 to 10% by weight of organic fibre and 2 to 15% by weight of binder.

The permeability of the backing layer may be about 10 AFS and preferably is greater than 20 AFS; the permeability of the facing layer is preferably less than 5 AFS.

The density of the backing is preferably in the range of 0.65 to 1.4 g/cm$^3$. At lower densities the backing may be substantially compressed during use and initially good heat-insulation properties consequently reduced to an unsatisfactory level. At high densities the heat-insulating properties of the backing may be inadequate unless the backing is unduly thick.

The magnesium oxide in the facing is highly refractory but tends to be associated with relatively high densities and only moderate heat-insulation properties. However, by use of a more heat-insulating backing, good heat-insulation can be provided by the slab as a whole. The nature of the backing can readily be so chosen as to provide good heat-insulation, e.g. by making the backing of low density, because the backing does not need to have the erosion resistance of the facing.

If it is more important that the entire slab should have good erosion resistance than that the slab should provide particularly good heat-insulation, then the backing is preferably of high density and preferably includes a refractory filler, especially magnesium oxide, that promotes erosion resistance. In this way, even if, after a time, the facing is entirely eroded away, good erosion resistance can be provided by the backing. In use, the backing of a slab of the invention rapidly becomes sufficiently hot for the hydrogen of any hydrogen-containing matter to be driven off as hydrogen-bearing gases, and these can escape preferentially through the backing and into the atmosphere rather than through the facing and into the molten metal. Accordingly, even if the facing is liable to be entirely eroded away, the backing does not need to be of low hydrogen content.

If the function of the facing is chiefly to provide a low hydrogen content layer to face the molten metal and the backing is of substantial erosion resistance, the facing may be relatively thin e.g. 5 mm and the backing relatively thick e.g. 25 mm. If, however, the facing is to provide all the erosion resistance desired for the slab and the backing is to provide good heat-insulation but is of relatively low erosion resistance, the facing and backing may be of generally similar thickness e.g. 15 mm each.

As already stated, the facing is slurry-formed and this can be achieved by de-watering an aqueous slurry of the ingredients in a suitably shaped permeable mould and subsequently heating the product to dry it and to render the binder effective. The backing can then be formed on top of the facing by a slurry process or by methods known for forming shapes of foundry sand e.g. core shooting. Preferably, however, the backing is formed first and an aqueous slurry of the facing ingredients then injected above or beneath it and de-watered and the slab then heated to dry it and to render effective the binder in the facing. The binder used in the backing may be one that can be hardened at ordinary ambient temperatures e.g. it may be a resin that is hardened by use of a catalyst.

Whilst the slabs of the invention are adapted to cause little or no pick-up of hydrogen by steel passing through the tundish, it should be appreciated that some pick-up of hydrogen by the steel may result from other causes e.g. water present in any refractory cement exposed to the steel in the tundish. Accordingly, the use of refractory cements should be avoided or minimised or it should be ensured that any such product is well dried before the tundish is used.

The invention includes not only the slabs themselves but also methods of making them as described above and tundishes having an inner, expendable lining of the slabs.

The invention is illustrated by the following Examples.

EXAMPLE 1

The following ingredients in the percentages (by weight) specified were formed into a first aqueous slurry:

| Ingredient | % |
|---|---|
| silica flour | 11 |
| silica sand | 80 |
| calcium silicate fibre | 2.6 |
| paper fibre | 2 |
| phenol formaldehyde resin | 3.1 |
| urea-formaldehyde resin | 1.3 |

The slurry was de-watered in a permeable mould shaped to form a slab.

The following ingredients in the percentages (by weight) specified were formed into a second aqueous slurry:

| Ingredient | % |
|---|---|
| magnesium oxide (hydration value 0.12) | 88 |
| aluminosilicate fibre | 3 |
| sodium silicate powder ($SiO_2$:$Na_2O$ weight ratio 3.35:1) | 6 |
| ball clay | 3 |

The second slurry was introduced into the mould over the layer obtained by de-watering the first slurry and was de-watered through that layer. The matter in the mould was then removed as a damp two-layer slab and was heated at 180° C. to dry it and to harden the binder in each of the layers.

The two layers of the slab obtained as described above adhered together well and the first layer deposited i.e. the backing had a thickness of 16 mm and a density of 1 g/cm$^3$ and the second layer deposited i.e. the facing had a thickness of 14 mm and a density of 1.6 g/cm$^3$. The first layer had a permeability of 35 AFS and the second layer had a permeability of 5 AFS.

EXAMPLE 2

Example 1 above was repeated with the exception that the second aqueous slurry was formed as follows:

| Ingredient | % |
|---|---|
| magnesium oxide (hydration value 1.0) | 91.9 |
| aluminosilicate fibre | 3.0 |
| sodium silicate powder ($SiO_2$:$Na_2O$ weight ratio 3.2:1) | 5.0 |
| polyester fibre | 0.1 |

The first layer deposited i.e. the backing had a thickness of 15 mm and a density of 1 g/cm$^3$ and the second layer deposited i.e. the facing had a thickness of 15 mm and a density of 1.7 g/cm$^3$. The first layer (the backing) had a permeability of 35 AFS and the second layer (the facing) had a permeability of 3 AFS.

We claim:

1. A refractory, heat-insulating slab for use in the inner, expendable lining of a tundish comprising a slurry-formed facing (to face the molten metal in the tundish), comprising magnesium oxide having a hydration value of 1.7 or less, inorganic binder but substantially no organic matter, the said facing having a combined water content not exceeding 2% by weight at ambient temperature and a different backing comprising refractory filler and binder, the said backing having a permeability value of at least 10 AFS units, the facing and the backing having been joined together during formation of the facing or the backing.

2. A slab according to claim 1 wherein the magnesium oxide in the facing is a high temperature calcined magnesite.

3. A slab according to claim 1 wherein the total organic matter present in the facing does not exceed 0.25% by weight.

4. A slab according to claim 1 wherein the combined water content of the facing does not exceed 1% by weight.

5. A slab according to claim 4 wherein the combined water content does not exceed 0.5% by weight.

6. A slab according to claim 1 wherein the facing comprises 75% to 95% by weight of refractory filler of which more than 50% by weight is magnesium oxide.

7. A slab according to claim 6 wherein the refractory filler comprises a mixture of dead-burnt magnesite and at least one of chromite, alumina, zirconium silicate, olivine, silica, zirconia and high alumina aluminosilicates.

8. A slab according to claim 1 wherein the facing comprises 1 to 10% by weight of refractory fibre.

9. A slab according to claim 1 wherein the inorganic binder is present in the facing in an amount of 2 to 10% by weight.

10. A slab according to claim 9 wherein the inorganic binder is an alkali metal silicate having a $SiO_2$:$Na_2O$ ratio in the range of 2.5 to 3.7:1.

11. A slab according to claim 1 wherein the backing comprises an organic binder.

12. A slab according to claim 1 wherein the facing has substantially no hydrogen containing matter.

13. A method of continuously casting a low-hydrogen steel comprising pouring the steel into a continuous casting mould via a tundish having an inner expendable lining comprising a refractory, heat-insulating lining having a facing comprising magnesium oxide having a hydration of value of 1.7 or less, inorganic binder but substantially no organic matter, the said facing having a combined water content not exceeding 2% by weight at ambient temperature and a different backing comprising refractory filler and a binder and having a permeability value of at least 10 AFS units, the said facing and the said backing having been joined together during formation of the facing or the backing.

14. A tundish having an outer metal casing, a permanent lining of refractory material and an expendable inner lining comprising a number of refractory, heat-insulating slabs wherein at least the slabs comprising the side and end walls of the inner lining have a facing comprising magnesium oxide having a hydration value of 1.7 or less, inorganic binder but substantially no organic matter, the said facing having a combined water content not exceeding 2% by weight at ambient temperature and a different backing comprising refractory filler and a binder and having a permeability value of at least 10 AFS units, the facing and the backing having been joined together during formation of the facing or the backing.

15. A tundish as recited in claim 14 wherein the magnesium oxide in the facing of each of said slabs is a high temperature calcined magnesite.

16. A tundish as recited in claim 14 wherein the total organic matter present in the facing of each of said slabs does not exceed 0.25 percent by weight.

17. A tundish as recited in claim 14 wherein the combined water content of the facing of each of said slabs does not exceed 0.5 percent by weight.

18. A tundish as recited in claim 14 wherein the facing of each of said slabs comprises 75–95 percent by weight of refractory filler of which more than 50 percent by weight is magesium oxide.

19. A tundish as recited in claim 14 wherein the facing of each of said slabs has substantially no hydrogen containing matter.

20. A tundish as recited in claim 14 wherein for each of said slabs the facing comprises 1–10 percent by weight of refractory fiber, inorganic binder is present in an amount of 2–10 percent by weight, and wherein the backing of each of said slabs comprises an organic binder.

* * * * *